United States Patent
Keller et al.

(10) Patent No.: US 8,684,436 B2
(45) Date of Patent: Apr. 1, 2014

(54) INTERMEDIATE PRODUCT COMBINATION FOR AN INTERNAL TRIM PART OF A VEHICLE AND INTERNAL TRIM PART

(71) Applicant: Faurecia Innenraum Systeme GmbH, Hagenbach (DE)

(72) Inventors: Bernd Keller, Karlsruhe (DE); Dominique Desgranges, Auneuil (FR)

(73) Assignees: Faurecia Innenraum Systeme GmbH, Hagenbach (DE); Faurecia Interieur Industrie, Meru Cedex (FR)

( * ) Notice: Subject to any disclaimer, the term of this patent is extended or adjusted under 35 U.S.C. 154(b) by 0 days.

(21) Appl. No.: 13/749,824

(22) Filed: Jan. 25, 2013

(65) Prior Publication Data
US 2013/0134728 A1     May 30, 2013

Related U.S. Application Data

(63) Continuation of application No. PCT/EP2011/003797, filed on Jul. 28, 2011.

(30) Foreign Application Priority Data

Jul. 27, 2010   (FR) ..................................... 10 56190
Mar. 12, 2011   (DE) ....................... 10 2011 101 325

(51) Int. Cl.
B62D 39/00     (2006.01)

(52) U.S. Cl.
USPC ........................................ 296/1.08; 52/716.5

(58) Field of Classification Search
USPC ............................ 296/1.08; 52/716.5; 428/31
See application file for complete search history.

(56) References Cited

U.S. PATENT DOCUMENTS

| 6,092,835 A | 7/2000 | Thakore et al. |
| 2003/0230044 A1* | 12/2003 | Peterson ...................... 52/716.5 |
| 2004/0227038 A1 | 11/2004 | Strasser |

FOREIGN PATENT DOCUMENTS

| FR | 2874890 A1 | 3/2006 |
| GB | 2379421 A | 3/2003 |
| WO | 2006024527 A1 | 3/2006 |

OTHER PUBLICATIONS

The International Bureau of WIPO, PCT, International Preliminary Report on Patentability and Written Opinion of the International Searching Authority in PCT International Application No. PCT/EP2011/003797, mailed Feb. 7, 2013.
European Patent Office, International Searching Authority, "International Search Report" mailed Sep. 21, 2011; International Appln. No. PCT/EP2011/003797, filed Jul. 28, 2011.

* cited by examiner

*Primary Examiner* — Lori Lyjak
(74) *Attorney, Agent, or Firm* — Ingrassia Fisher & Lorenz, P.C.

(57) ABSTRACT

Intermediate product combinations for internal trim parts of a vehicle are provided herein. In one example, an intermediate product combination comprises a base part having an installation point in which a through-opening is formed for receiving an installation means with which an attachment part can be clamped to the base part on a surface of the base part (30). The edge region of the through-opening in the base part is provided with a shoulder, which surrounds the through-opening and projects from the surface on which the base part can be installed at the edge region of the through-opening, so that the attachment part can be supported by the shoulder when the attachment part is installed on the base part.

9 Claims, 7 Drawing Sheets

INTERMEDIATE PRODUCT COMBINATION FOR AN INTERNAL TRIM PART OF A VEHICLE AND INTERNAL TRIM PART

CROSS-REFERENCE TO RELATED APPLICATION

This is a continuation application claiming priority to International Application No. PCT/EP2011/003797, filed Jul. 28, 2011, which was published under PCT Article 21(2), German patent application DE 10 2011 101 325.7, which was filed on May 12, 2011, and French patent application FR 1056190, which was filed on Jul. 27, 2010, which are all hereby incorporated in their entirety by reference.

TECHNICAL FIELD

The technical field relates to an intermediate product combination or a preform for an internal trim part of a vehicle and an internal trim part of this type.

BACKGROUND

Intermediate product combinations for an internal trim part of vehicles and an internal trim part of this type, which have a plurality of components, are known from the general prior art.

SUMMARY

The object of various embodiments is to provide an intermediate product combination or a preform for an internal trim part of a vehicle and an internal trim part of this type, with which fluid-tight connection of the components is possible when the internal trim part is formed from a plurality of components.

This object is achieved with the features of the independent claims. Further embodiments are specified in the sub-claims referring back thereto.

One embodiment of the intermediate product combination or an intermediate product combination arrangement or preform for an internal trim part of a vehicle has: a base part having an installation point in which a through-opening is formed for receiving an installation means with which an attachment part can be clamped to the base part on a surface of the base part, wherein the edge region of the through-opening in the base part is provided with a shoulder, which surrounds the through-opening and projects from the surface on which the base part can be installed at the edge region of the through-opening, so that the attachment part can be supported by the shoulder when the attachment part is installed on the base part. The shoulder which is provided at the through-opening and projects from the surface of the side of the base part which is provided for installing the attachment part has the advantages that non-uniformities in the surface of the base part and defects in the installation of the attachment part on the base part can be compensated by the shoulder. If for example the attachment part on the component is not attached or clamped to the base part according to instructions, warpage stresses in the base part and/or in the attachment part can lead to the attachment part lifting up from the base part, which can result in leaks at the through-opening between the base part and the attachment part installed thereon. These warpage stresses can be compensated with the shoulder which surrounds the through-opening, so that a fluid-tight join between the base part and the attachment part installed thereon can be ensured.

According to another embodiment of the intermediate product combination, the shoulder surrounds the through-opening in a continuous and circumferential manner. I.e. the shoulder has no gaps or interruptions. The shoulder can however have interruptions or gaps if the attachment part has corresponding projections or shoulders which close these gaps or interruptions in a fluid-tight manner when the attachment part and the base part are assembled. The shoulders on the attachment parts can act as aids for positioning the attachment part on the base part. It lies within the scope of the embodiment that the through-openings are provided with circumferential and uninterrupted shoulders are provided in a mixed manner on the base part, the attachment part being provided with projections or shoulders which close the gaps at the corresponding positions. Better fluid-tight sealing between the component and the attachment part installed thereon is ensured by the shoulder surrounding the through-openings in a continuous manner. A higher compressive stress is built up at the linear bearing face of the shoulder for the attachment part when the base part and the attachment part are installed, so greater fluid-tightness can be achieved there.

According to a further embodiment of the intermediate product combination, the shoulder is formed in one piece with the base part, in particular by injection moulding, or the shoulder is moulded or adhesively bonded on the base part. The shoulder of the base part is preferably produced together with the base part. This has the advantage that fewer additional work steps are necessary. However, it lies within the scope of the invention that the shoulder can be moulded or adhesively bonded on the base part afterwards. This has the advantage that the shoulder can be formed from a different material from the base part, it being possible for materials to be used for the shoulder which have better sealing properties and are better suited for compensating irregularities in the base part and/or attachment part. It lies within the scope of the invention that the shoulder can also be moulded on the attachment part, and the base part has no shoulder or has a groove which is complementary to the shoulder for receiving the shoulder of the attachment part, so the shoulder on the attachment part provides a sealing effect and also a positioning aid when the base part has corresponding receiving grooves.

According to a further embodiment of the intermediate product combination, the shoulder is a separate element which can be combined with the installation means, the attachment part and/or the base part for sealing off the through-opening.

According to a further embodiment of the intermediate product combination, the shoulder of the base part is arranged at a predefined radial distance from the through-opening wall. It is however within the scope of the embodiment that the shoulder is directly adjacent to the through-opening wall without being spaced apart from the through-opening.

According to one embodiment of the intermediate product combination, the shoulder comprises a material which allows plastic deformation when pressure is applied to the shoulder. This has the advantage that better compensation of irregularities and warpage stresses can be achieved by the additional plastic deformation. Furthermore, better fluid-tightness can be achieved by the plastic deformation of the shoulder owing to the pressure of the attachment part.

According to a further embodiment of the intermediate product combination, the shoulder has a cross section which is semicircular, triangular and/or rectangular. This has the advantage that a simpler plastic deformation is possible, depending on the shape of the cross section. If the shoulder has a triangular cross section in the component thickness direction of the base part, higher compressive stresses are likely at the triangle point, less deformation at lower pressure then being likely there. The selection of the cross section shape is also dependent on the material used for the shoulder. If a less easily deformable material is used for the shoulder, the cross section of the shoulder is selected to be such that the shoulder is deformed at low compressive stresses at the contact point between the attachment part and the base part when pressure is applied by the installation means. The triangular cross section is in particular preferred if the distance of the shoulder of the through-opening wall is particularly small and a deformation of the shoulder would block the through-opening.

An internal trim part according to the embodiment for a vehicle has the base part with an installation point in which a through-opening is formed for receiving an installation means with which an attachment part can be clamped to the base part on a surface of the base part, wherein the edge region of the through-opening in the base part is provided with a shoulder which surrounds the through-opening and projects from the surface on which the base part can be installed at the edge region of the through-opening, so that the attachment part can be supported by the shoulder when the attachment part is installed on the base part, wherein the installation means has an installation element which has a first end section for insertion into the through-opening and a second end section for supporting at the installation point of the base part, and a counter element which can be coupled to the first end section so that the attachment part can be clamped to the base part. The two-part installation element has the advantage that the attachment part can be attached detachably to the base part. The base part and the attachment part can be recycled more easily owing to the detachable connection. Furthermore, it is possible with the installation means and the counter means to install the attachment part and the base part with a predefined compressive stress against each other.

According to one embodiment of the internal trim part, the installation element is a screw, a bolt or a rivet and the counter element is a nut or a rivet closing head. The above-mentioned connection means offer the advantage of producing detachable connections, which allow the compressive stress with which the attachment part is pressed against the base part by means of the installation element and the counter element to be defined by a predefined tightening torque, especially in the case of screw connections, it also being possible to define how much the shoulder on the base part is deformed when the attachment part is installed. The embodiments described herein are however not limited to the above-mentioned installation and counter means. Rather, all connection and installation elements which allow the attachment part to be clamped to the base part with a predefined pressure lie within the scope of the invention, so that a controlled plastic deformation of the shoulder is possible in order to achieve a predefined fluid-tightness between the attachment part and the base part.

According to another embodiment of the internal trim part, the base part is an injection-moulded part. The base part can however also be formed from another material and/or be produced using another method. The base part can be produced from a plastic material, metal or composite material. The essential thing here is that the material or materials used are also suitable for subsequent injection moulding.

The shoulder is provided with a sealing function as a raised geometry with the base part according to the invention. The shoulder can be moulded onto the base part during the process of injection-moulding the latter. The shoulder is shaped according to the embodiment from a plastically deformable material and/or in such a manner that the shoulder can be plastically deformed in a targeted manner when the attachment part is installed and is thus provided as tolerance and warpage compensation of the parts to be installed. The plastic deformation also allows a form-fitting connection between the attachment part and the base part, which seals off in a fluid-tight manner from the foam internal pressure prevailing in an injection-moulding device.

BRIEF DESCRIPTION OF THE DRAWINGS

Further advantageous configurations of the exemplary embodiments are explained in more detail below in conjunction with the attached drawings. Components having similar functions are sometimes provided with the same reference symbols. The terms "left", "right", "top", "bottom" used in the description of the exemplary embodiment refer to the drawings in an alignment with normally readable figure title and reference symbols. In the figures listed below, the described elements are enlarged for better understanding and are not shown to scale. In the figures.

DETAILED DESCRIPTION

Figure 1:
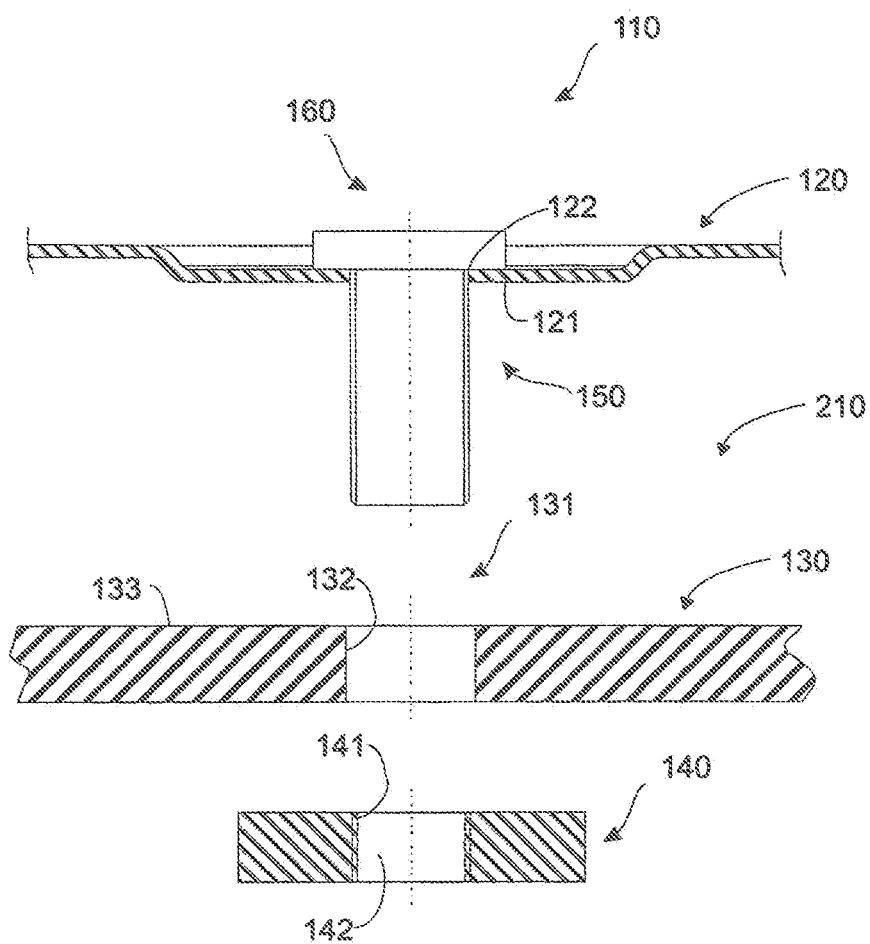
FIG. 1 shows an exploded and partial section view of a point for fastening an attachment part to a base part with the associated screw connection for forming an internal trim part with an original embodiment of the base part.
Figure 2:
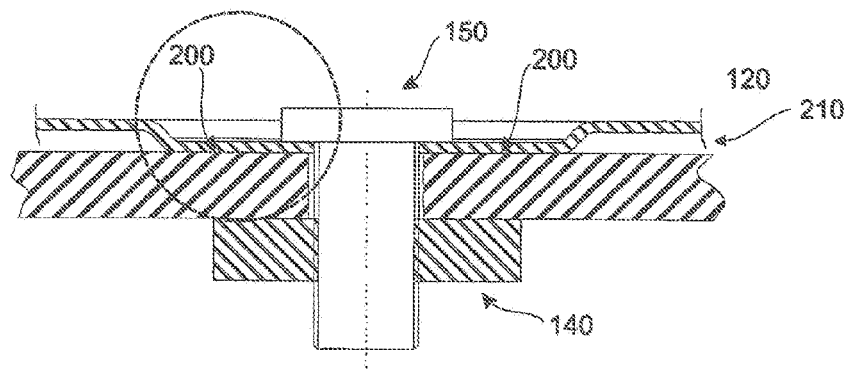
FIG. 2 shows a partial section view of a point for fastening the attachment part to the base part with the associated screw connection for forming an internal trim part with the original embodiment of the base part of FIG. 1 in the assembled state.
Figure 3:
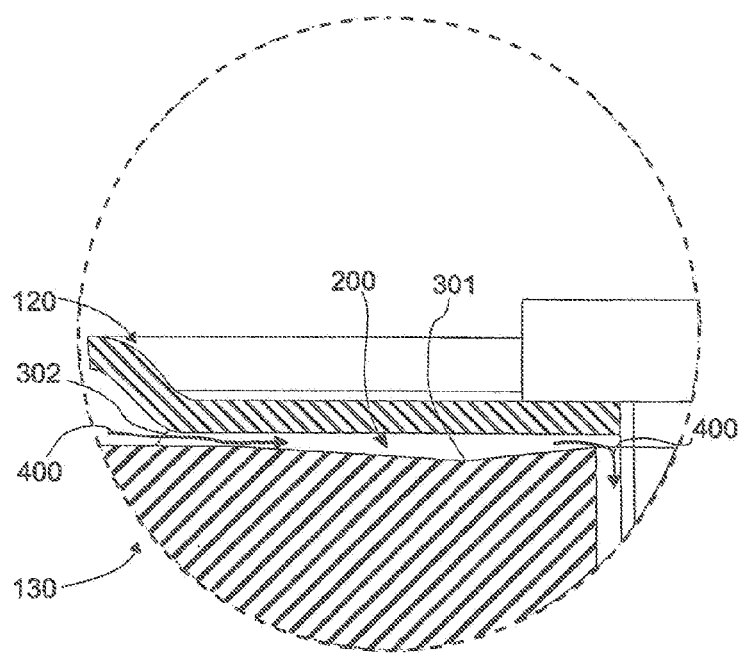
FIG. 3 shows an enlarged detail section view of the fastening point according to the circular section in FIG. 2.

FIGS. 1 to 3 show an embodiment of a base part 130 which is an intermediate product or an intermediate product combination for producing an internal trim part and preferably extends in an areal manner to be able to cover a supporting structure in the interior of a motor vehicle by being applied to the same. The base part 130 acts in particular to strengthen or reinforce the internal trim part or an intermediate product during production of the same. The base part 130 can in particular comprise plastic or be an element produced using an injection-moulded method. The base part 130 can in particular be formed to make the internal trim part dimensionally rigid, in particular so that a decorative layer and optionally underneath this a soft layer for producing haptic properties on the outer side of the internal trim part is formed on the latter and/or so that an attachment part can be fastened to the base part 130, which attachment part can in turn be suitable as a connecting part for applying a further support part or a functional part or a fastening device. Furthermore, the base part can for example be formed as an intermediate product for producing the support structure for an internal trim part in a vehicle. In the embodiment shown in FIG. 1, the base part 130 has at least one through-opening 131 for receiving in each case one connection element or installation means 160 for fastening an attachment part or connecting piece of an attachment part or connecting piece for an attachment part 120 to the base part 130. The installation means 160 can, as shown in FIG. 1, in particular be a screw 150 and alternatively be formed of a combination of a screw and a nut 140. The intermediate product combination 110 has the base part 130 and an attachment part 120 or a connecting piece of an attachment part or a connecting piece for an attachment part.

FIG. 1 shows an exploded view of an embodiment of an intermediate product combination or an intermediate product combination arrangement, that is, an intermediate product combination 110 for an internal trim part. The intermediate product combination 110 shown in an exploded and partial section view in FIG. 1 extends in an areal manner, as does the intermediate product combination 10 according to the embodiment shown in FIG. 8. The intermediate product combination 110 has the base part 130 and an attachment part or a connecting piece of an attachment part or a connecting piece for an attachment part 120. These alternative options are referred to as "attachment part" for short below. In the original embodiment of the intermediate product combination 110, the attachment part 120 is installed on the base part 130, wherein after attaching the attachment part 120 on the base part 130 this intermediate product or intermediate product combination is inserted in an injection-moulding device. In this subsequent method step, material for forming a soft intermediate or under-layer, such as a foam layer (not shown) or similar material is injected behind the base part 130 at least in some regions in the injection-moulding device. The injection-moulding which is made at least in some regions takes place at least in an area which extends in an areal manner between the attachment part 120 and the base part 130 when the latter are in an assembled state as shown in FIG. 2.

The attachment part 120 can for example be an airbag panel or a decorative frame, which are each in particular formed from metal. The attachment part 120 is fastened to the base part 130 at predefined fastening points 210 by means of a connection device such as in particular a screw connection 160, which can be inserted into a through-opening 122 in the attachment part 120 and into a through-opening 132 in the base part 130. A plurality of through-openings 132, into which in each case one connection element such as in particular a screw can be inserted, can also be provided on the base part 130. A plurality of through-openings 132 can in particular be arranged adjacently to each other in such a manner that an attachment part 120 or a connecting piece of an attachment part or a connecting piece for an attachment part can be fastened by means of a plurality of screws by means of connecting devices such as connecting elements. The screw connection 160 in particular has a screw 150 and a nut 140. If the attachment part 120 is screwed to the base part 130 as shown in FIG. 2, further processing, such as injection moulding behind the base part, can take place. To thus end, the base part 130 together with the attachment part 120 screwed thereto or a connecting piece of an attachment part or a connecting piece for an attachment part is inserted into a corresponding injection-moulding device, so that for example a foam layer can be injected behind the side of the base part 130 on which the attachment part 120 is installed. A plurality of attachment parts 120 or a connecting piece of an attachment part or a connecting piece for an attachment part can be arranged on the base part, if the base part is formed with a corresponding number of openings 131.

To achieve process-safe sealing at the respective fastening points 210 between the attachment part 120 and the base part 130, the attachment part 120 is screwed to the base part 130 by means of the screw connection 160 with a predefined torque in such a manner that the attachment part 130 is tensioned with its installation section 121 flat against the surface 133 of the base part 130, as shown in FIG. 2. Alternatively or additionally, it can be provided for the bearing face, which faces the base part, of the attachment part 120 or connecting piece of an attachment part or connecting piece for an attachment part to be treated, e.g. ground or coated, in such a manner that the attachment part can bear closely against the base part after the fastening of the connection device. Liquid injection-moulding mass, indicated in FIG. 3 with arrows 400, 401, can be prevented from leaking by the connection 200 over theoretically the entire area, as shown in FIG. 2. This is a particularly simple and cost-effective solution according to the invention, with which the risks described below can be reduced.

Installation generally takes place with a predefined tightening torque, which is where necessary checked when safety-relevant attachment parts such as airbag panels are installed. After installation there is theoretically a circumferential, face-fitting connection 200 at the contact points between the base part 130 and the attachment part 120, which connection provides an installation and sealing function.

A further embodiment is aimed at minimizing the effect of irregularities 301, 302 (see FIG. 3) in the surface 133 of the base part and/or the effect of warpage stresses in the base part 130, so that in particular the attachment part 120 is in particular prevented from partially lifting off from the surface 133 of the base part 130. Warpage stresses in the base part 130 can occur for example if a predefined installation order is not followed for the respective attachment part in the case of a plurality of installation points 210 with corresponding screw-on points, so that a sufficiently flat connection 200 between the contact points of the attachment part 120 and the base part 130 is not formed.

FIG. 2 shows a partial section view of the assembled intermediate product combination 110. The attachment part 120 is screwed onto the base part with a predefined torque by means of the screw 150 and the nut 140, so that a flat connection 200 is formed, which is theoretically sufficiently fluid-tight to prevent injection-moulding material from flowing out during the injection-moulding process. However, leaks can occur at the flat connection 200 owing to incorrect attachment of the attachment part 120 to the base part 130 and/or irregularities 301, 302 in the surface 133 of the base part 130, as shown in FIG. 3. These leaks can result in injection-moulding material flowing out of the through-opening 132 during the injection-moulding process, as indicated by the arrows 400.

If there is not a sufficient flat connection 200 to the fastening point 210, as shown in an exaggerated manner in FIG. 3, sufficient sealing cannot be provided at the contact point or flat connection 200 between the attachment part 120 and the base part 130. If there is an insufficient flat connection 200, injection-moulding material, indicated with the arrows 401, 402 can be pushed through the flat connection 201 owing to the mould internal pressure of up to 3 bar which occurs during foaming. Even minimal losses in pressure around the installation region of the screw connection 160 can result in failure of the installation and sealing function at the flat connection 200. Even defective screw-fastening with an insufficient torque can result in the pressure of the attachment part 120 against the base part 130 built up by the screw connection leading to an insufficient flat connection 200, out of which injection-moulding mass can flow, which can result in destruction of the foam structure. Consequently, this leads to reworking or in the worst case rejection, if the installation regions or installation points are in safety-relevant regions. Safety-relevant installation regions are for example installation points which lie in the region of an airbag device. These risks are avoided by the embodiments according to FIGS. 4 to 9d.

Figure 4:
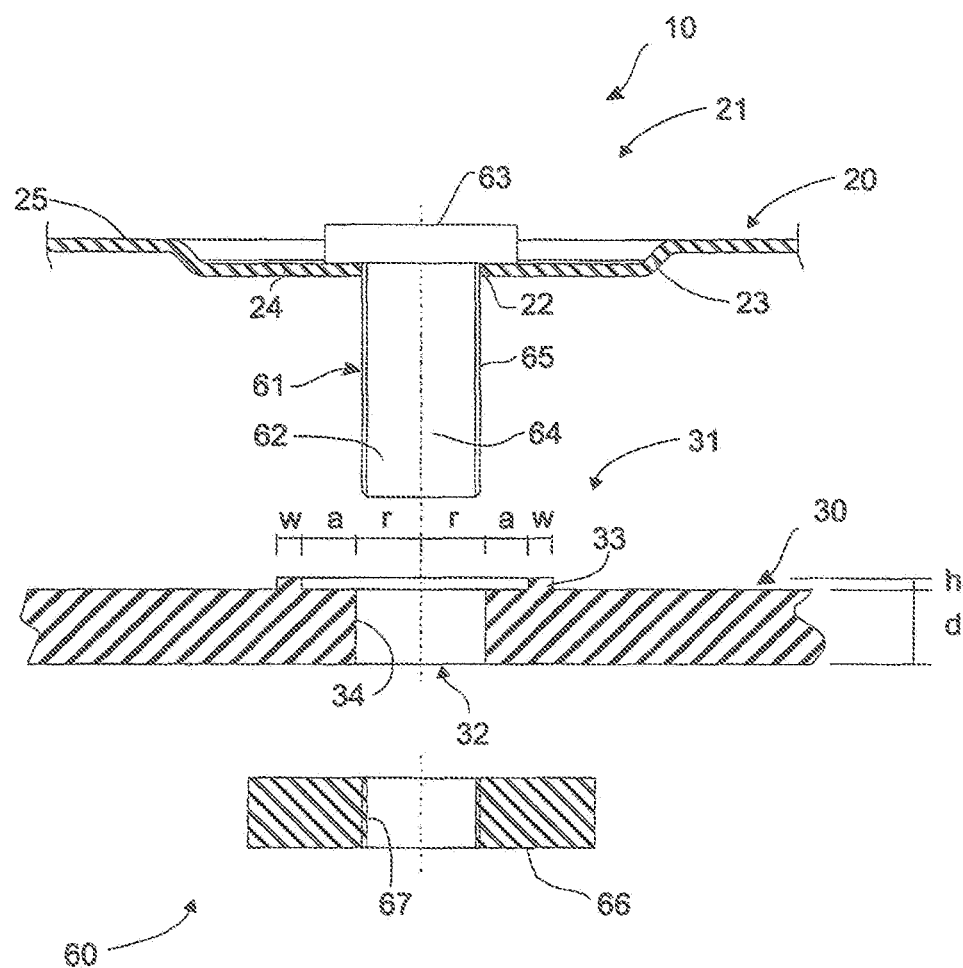
FIG. 4 shows an exploded and partial section view of a point for fastening an attachment part to a base part according to the invention with the associated screw connection for forming an internal trim part.

FIG. 4 shows a base part 30 according to the embodiment, having at least one through-opening 32, which is delimited by a through-opening wall 34 of the base part 30. Furthermore, a shoulder or projection 33 is provided on the base part 30, which shoulder or projection extends in a circumferential manner around the through-opening 32 and is formed as a raised portion which runs around the through-opening 32. The shoulder 33 is spaced apart from the through-opening wall 34 at a distance "a" and has a predefined height "h" and width "w." The shoulder 33 is preferably injected or moulded to the base part 33 at an installation point 31 for the attachment part 20 and completely surrounds the through-opening 32.

Figure 8:
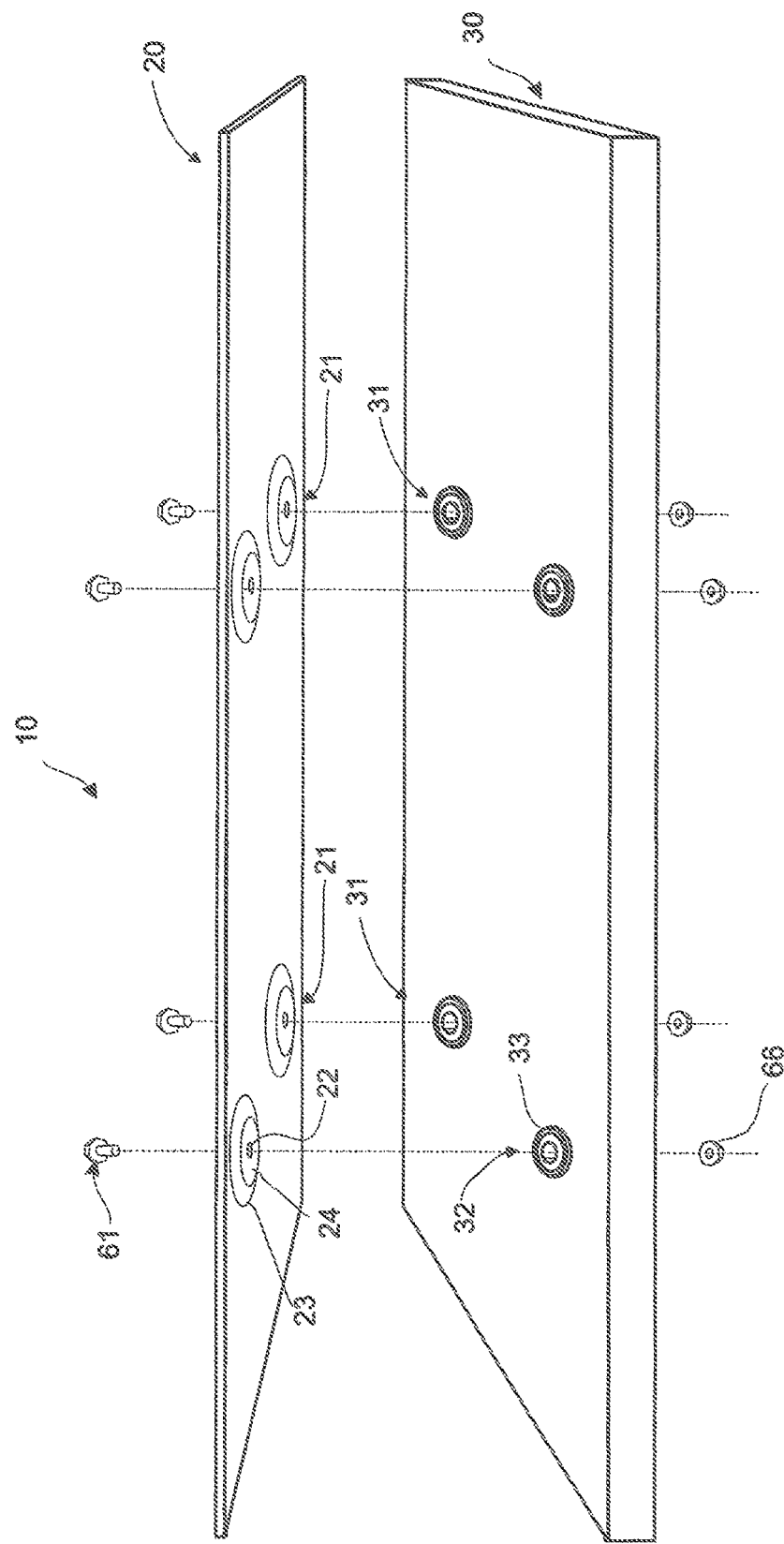
FIG. 8 shows a schematic, perspective exploded view of the base part according to the embodiment, of the attachment part and of the associated screw connection.

The attachment part 20 is shown in a partial section view in FIG. 4, a schematic perspective exploded view of the attachment part 10 being shown together with the component according to the embodiment in FIG. 8. In one embodiment, the attachment part 20 has a depressed installation point 21 having generally at least one through-opening 22 for receiving a second end section 63 of in each case one installation means such as in particular a connection element of a connection device. The connection element can in particular be a screw, bolt or rivet. The installation point 21 can generally be formed as a substantially circular depression or lowered portion 24, which is connected to the shaped section 25 forming the attachment part 20 via a ramp section 23. The depth of the depression 24 is advantageously sunk deeply with respect to the shaped section 25 in such a manner that the plane formed by the surface of the second end section 63 of the installation means 61 is substantially flush with the surface profile of the shaped section 25 of the attachment part 20 which is adjacent to the ramp section 23.

The raised portion can in particular be raised on one of its sides or both of its sides in a step-like or ramp-like manner from the surface of the base part which extends areally around the through-opening 32.

More than one through-opening 32 can also be arranged in the base part and in particular in the depressed region, it being possible for the plurality of through-openings 32 to be formed in the base part 30 in particular adjacently or at a not too great distance in such a manner that an attachment part can be fastened with a plurality of connection devices to the said base part and to connection elements or connection devices inserted in the through-openings. This makes a particularly secure and/or rigid fastening of the attachment part possible. A plurality of "islands" or projections can therefore be formed in a depressed region. A plurality of through-openings 32 can also be surrounded by a circumferential projection according to the invention.

The installation element 61 has a first end section 62 and a second end section 63, the first end section 62 being formed for installation with a counter element 66 and the second element 63 being formed for supporting on the edge region of a through-opening 22 formed in the attachment part 20. The installation element 61 can be a screw, bolt or rivet. The counter element 66 is a nut 66 which matches the screw or bolt, it being possible in the case of a bolt for nuts to be provided at both end sections thereof, so that the connection element and the counter element 66 form a connection device.

The connection device can also be formed in such a manner that it only has one connection element, that is, no counter element 66. In this case, the through-opening 32 is formed in such a manner that the walls 34 thereof are suitable for receiving the connection element and for fastening it to the base part. It can in particular be provided for the walls 34 to have a counter thread or step or projection which can engage in a thread of a screw or connection element, so the walls can fulfil the function of a counter thread. Alternatively, a section which extends radially in sections from the walls and comprises a soft or deformable material can be formed, or the walls can be coated with a soft or deformable material, into which a thread of a connection element can be pressed in order to fulfil the function of a thread. In these cases, the screw can be a "self-tapping screw", which does not need a counter element.

In the case of a rivet, the counter element 66 is a rivet head. The installation element 61 and the counter element 66 can however comprise different elements from those mentioned above. The essential thing in this case is merely that the attachment part 20 can be installed on the base part 30 with a predefined pressure with the aid of the installation means 60 used, so that the shoulder 33 of the base part 30 is at least partially plastically deformable, so that a fluid-tight connection is produced between the attachment part 20 and the base part 30 at the contact point between the shoulder 33 of the base part 30 and the attachment part 20. Furthermore, the installation means 60 has the function of connecting the attachment part 20 to the component 30 sufficiently firmly for it to be suitable for use as an internal trim part in a vehicle.

The through-opening 32 extends through the entire thickness d of the base part 130 and has an internal radius r, so that the installation element 61 can be inserted with its first end section 62, in this case a screw with its shaft 63, into the through-opening 32. The screw 61 has a screw head 63, a shaft 64 and an external thread 65 which is formed on the shaft 64. The shaft 63 of the screw 61 extends through the through-opening 32 in such a manner that the screw 61 can be screwed to the base part 30 by means of a counter element 66, in this case a screw nut 66. When the attachment part 20 is connected to the base part 30 and the screw is inserted into the through-openings, the screw connection 60 comprises the screw 61 with the external thread 65 and the nut 66 with the corresponding internal thread 67 is preferably tightened with a predefined tightening torque, so that the shoulder 33 is at least partially plastically deformed.

The second end section 63 or the screw head can have a greater, smaller or else equal diameter to the shoulder 33. In the respective cases, a different sealing behaviour can be achieved in the respective applications of the invention.

The installation element 61 can be connected both the attachment part 20 and also alternatively to the base part 30, so that the respective counter piece can be installed e.g. with the aid of nuts or clamps or other means. A connection element can in particular be connected to the base part in such a manner that the connection section acts on the attachment part, e.g., the screw head can be placed against the side which is placed in the opposite direction to the bearing face for the attachment part and the counter element can be placed against the side of the attachment part.

FIGS. 5a to 5d show embodiments of the cross-sectional shape of the shoulder 33 on the base part 30.

Figure 5A:
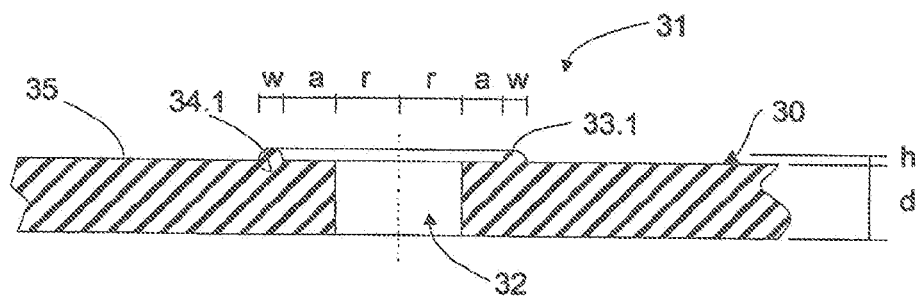
FIGS. 5a to 5d show sectional views of different embodiments of base parts according to the embodiment.

FIG. 5a shows a first embodiment of the shoulder 33, which is indicated in FIG. 5a with 33.1. The cross-sectional shape of the shoulder 33.1 is substantially semicircular in the cross section thickness direction "d" of the base part 30. The shoulder 33.1 can be formed in one piece with the base part 30, as shown on the right by the dash-dotted reference line, or injection-moulded onto the surface 35 of the base part 30. To injection-mould the shoulder 33.1, a recess 34.1 can be provided, which is likewise substantially semicircular in the cross section thickness direction "d" in a corresponding manner to the circular cross-sectional shape of the shoulder. The recess 34.1 is indicated with a dashed on the left of the dash-dotted reference line, while the alternative embodiment of the shoulder 33.1, which is formed in one piece at the same time as the base part 30, is shown on the right of the reference line. The shoulder 33.1 can be injection-moulded onto the base part 30 with a substantially circular cross-section shape if the recess 34.1 is present in the surface 35 of the base part and the shoulder is injected into the said recess. The shoulder 33.1 can be formed with a predefined height "h" and width "w" at a predefined distance "a" from the through-opening 32.

Figure 5B:
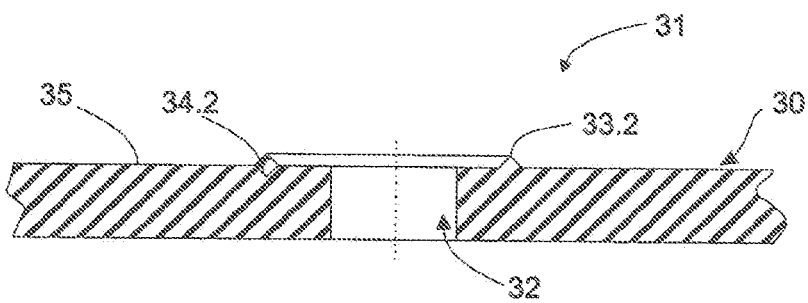

FIG. 5b shows an alternative embodiment of the shoulder 33, which is indicated in FIG. 5a with 33.2. The cross-sectional shape of the shoulder 33.2 is substantially triangular in the cross section thickness direction "d" of the base part 30. The shoulder 33.2 can be formed in one piece with the base part 30, as shown on the right by the dash-dotted reference line, or injection-moulded onto the surface 35 of the base part 30. To injection-mould the shoulder 33.1, a recess 34.2 can be provided, which is likewise substantially rectangular in the cross section thickness direction "d" in a corresponding manner to the rectangular cross-sectional shape of the shoulder 33.2. If the shoulder 33.2 is injection-moulded into the triangular recess 34.2, it has a substantially rhomboid cross-sectional shape after the injection-moulding. The shoulder 33.2 can be formed with a predefined height "h" and width "w" at a predefined distance "a" from the through-opening 32.

Figure 5C:
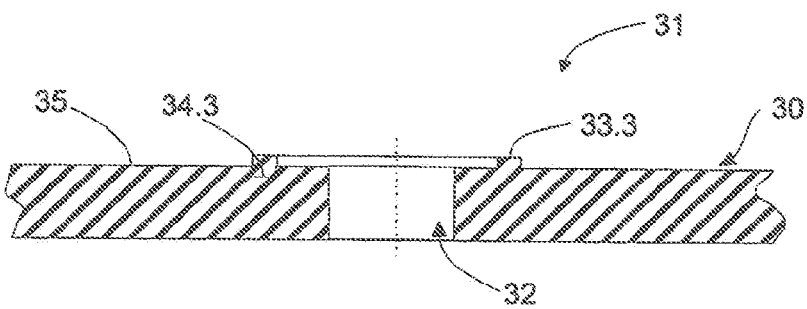

FIG. 5c shows an alternative embodiment of the shoulder 33, which is indicated in FIG. 5c with 33.3. The cross-sectional shape of the shoulder 33.3 is substantially rectangular in the cross section thickness direction "d" of the base part 30. The shoulder 33.3 can be formed in one piece with the base part 30, as shown on the right by the dash-dotted reference line, or injection-moulded onto the surface 35 of the base part 30. To injection-mould the shoulder 33.3, a recess 34.3 can be provided, which is likewise substantially rectangular in the cross section thickness direction "d" in a corresponding manner to the rectangular cross-sectional shape of the shoulder 33.3. If the shoulder 33.3 is injection-moulded into the rectangular recess 34.2, it has a substantially rectangular cross-sectional shape after the injection-moulding. The shoulder 33.3 can be formed with a predefined height "h" and width "w" at a predefined distance "a" from the through-opening 32.

Figure 5D:
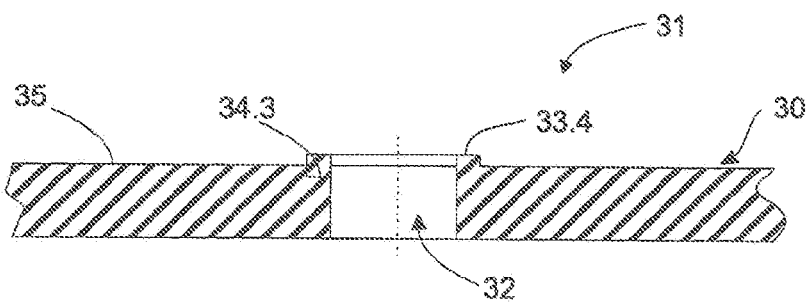

FIG. 5d shows an alternative embodiment of the shoulder 33, which is indicated in FIG. 5d with 33.4. The cross-sectional shape of the shoulder 33.4 is substantially rectangular in the cross section thickness direction "d" of the base part 30. The shoulder 33.4 can be formed in one piece with the base part 30, as shown on the right by the dash-dotted reference line, or injection-moulded onto the surface 35 of the base part 30. To injection-mould the shoulder 33.4, a recess 34.4 can be provided, which is likewise substantially rectangular in the cross section thickness direction "d" in a corresponding manner to the rectangular cross-sectional shape of the shoulder 33.4. If the shoulder 33.3 is injection-moulded into the rectangular recess 34.2, it has a substantially rectangular cross-sectional shape after the injection-moulding. The shoulder 33.4 can be formed with a predefined height "h" and width "w" directly on the through-opening wall 34 of the through-opening 32, as shown in FIG. 5d, so that the internal wall of the shoulder 33.4 merges directly into the through-opening wall 34 of the through-opening 32, forming a uniform, in particular step-free overall wall. It should be ensured here that the shoulder 33.4 can deform in such a manner that the through-opening 32 is not blocked thereby. The shoulders 33.1 to 33.3 shown in FIGS. 5a to 5c can also be formed without a distance "a" directly on the through-opening wall 34 of the through-opening 32, as shown in FIG. 5d.

In all the embodiments described in FIGS. 5a to 5d, the respective shoulder 33.1 to 33.4 is preferably produced from a material which has both fluid-tight properties and good plastic deformability. Moreover, it lies within the scope of the invention to inject the shoulder 33 into existing recesses 34.2 to 34.4, it being possible to combine a triangular, semicircular and rectangular groove or recesses 34.2 to 34.4 with the above-described cross-sectional shapes of the shoulders 33.1 to 33.4 in any desired manner. Furthermore, the respective shoulder 33 can also be adhesively bonded to the base part to the surface 35 or into the corresponding groove 34.1 to 34.4 with a suitable adhesive.

The injection-moulding of the shoulder 33.1 to 33.4 preferably takes place in a circumferential manner around the through-opening 32. The respective shoulders 33.1 to 33.4 can have different shapes, as shown in FIGS. 5a to 5c, the triangular shape being preferred. During the installation process, the assembly of the attachment part 20 with the base part 30 by means of the screw connection 60, in which the screw connection 60 is screwed to the base part 30 and the attachment part 20 with a predefined tightening torque, a plastic deformation of the shoulder 33 and thus warpage-compensating sealing between the attachment part 20 and the base part 30 takes place. The height-to-width ratio "h/w" of the shoulder 33.1 to 33.4 is matched to the expected warpage and installation tolerances and the used injection-moulding material of the base part 30 and shoulder 33.1 to 33.4. Sealing takes place by the attachment part 20 being pressed against the base part 30 as a linear load on the plastically deformed shoulder 33.1 to 33.4.

Figure 6:
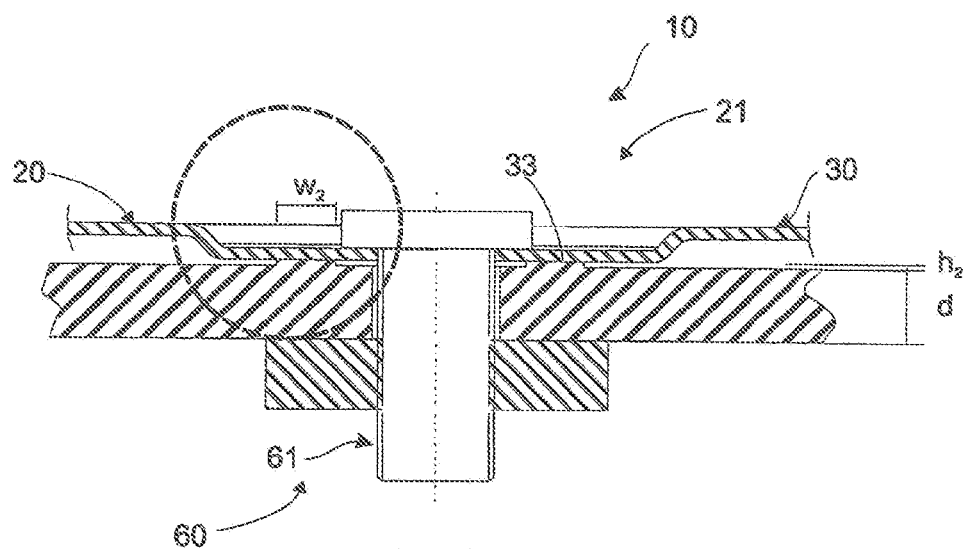
FIG. 6 shows a partial section view of the point for fastening the attachment part to the base part according to the embodiment of FIG. 4 with the associated screw connection in the assembled state.

FIG. 6 shows a partial cross-sectional view of the base part 30 according to the invention shown in FIG. 4 in an assembled state with the attachment part 20 and the installation means 60. The installation means 60 has a screw 62 and a nut 66. The screw 62 and the nut 66 are screwed to the base part 30 with a predefined tightening torque to install the attachment part 20, so that the shoulder 33 is plastically widened by a predefined extent from the original width "w" and original height "h" to the width "$w_2$" and compressed to the height "$h_2$," as shown in FIG. 6 and in detail in FIG. 7.

This plastic deformation of the shoulder 33 improves the fluid-tightness between the attachment part 20 and the base part 30. Furthermore, warpage stresses in the attachment part 20 and/or in the base part 30 can be better reduced by the plastic deformation of the shoulder 33 without the fluid-tightness of the attachment part 20 and base part 30 being impaired.

Figure 7:
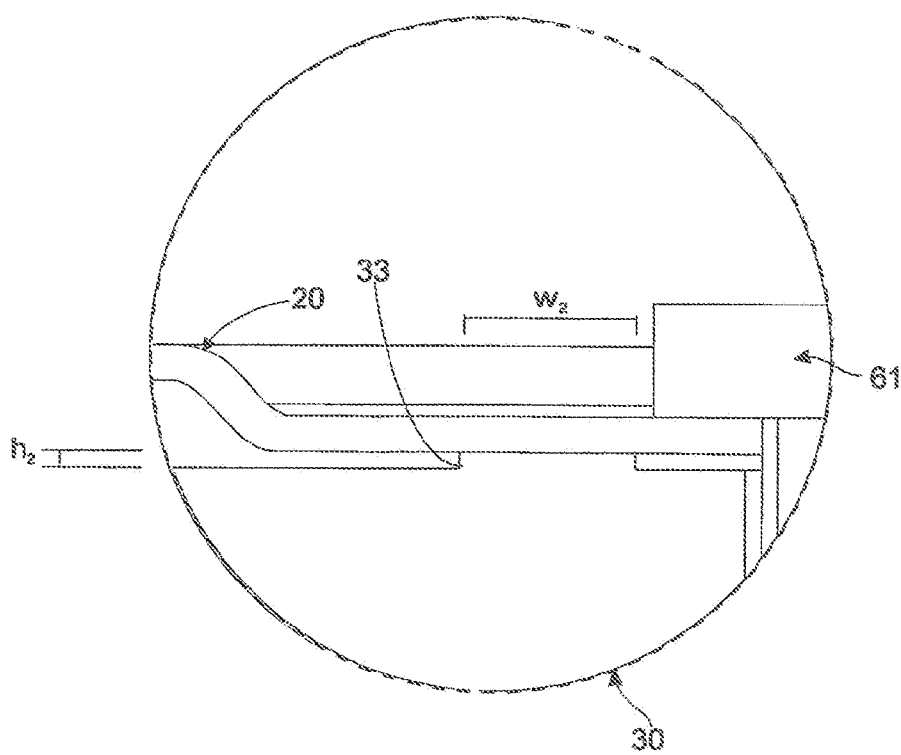
FIG. 7 shows an enlarged detail section view of the fastening point according to the circular section in FIG. 6.

The plastic deformation of the shoulder 33 is shown in an enlarged view in FIG. 7. The plastic deformation of the shoulder 33 to the new dimensions "$w_2$" and "$h_2$" can clearly be seen there. The section line of the enlarged detail view in FIG. 7 corresponds to the circular section lines in FIG. 6, indicated with the dashed circle in FIG. 6.

FIG. 8 shows a perspective, schematic exploded view of the base part 30 according to the embodiment and the attachment part 20 with the installation means 60. The installation means 60 has a screw 61 and a nut 66 per installation point 21.

In FIG. 8, the shoulder 33 can be seen arranged at a predefined distance a around each through-opening 32 of the base part according to the embodiment. The attachment part 20 is shown in a view from below, it being possible to see the through-openings 22 and the associated ramp sections 23 and depressions 24 of the attachment part 20 for receiving the respective screw head 63 of the screw 61.

The arrangement, number of installation points 21 and through-openings 22 in the attachment part 20 and of the shoulders 33 on the respective through-opening 32 shown in FIG. 8 is only one of the many possibilities of arranging the above-mentioned features on the base part 30 and attachment part.

FIGS. 9a to 9f show plan views of different embodiments of the shoulder 33 and through-opening 32, other designs of the shoulder 33 and through-opening 32 being conceivable.

Figure 9A:
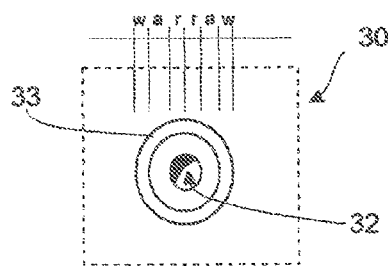
FIGS. 9a to 9f show schematic plan views of different embodiments of the base part according to the embodiment and an associated through-opening.

FIG. 9a shows a plan view of the base part 30 according to the embodiment with the shoulder 33, corresponding section views thereof being shown in FIGS. 5a to 5c. The shoulder 33 shown in a plan view in FIG. 9a and the shoulders 33 shown in the other FIGS. 9b to 9f can in each case have the cross-sectional shapes shown in FIGS. 5a to 5c.

As shown in FIG. 9a, the shoulder 33 is spaced apart at a distance a from the through-opening 32 with the opening width with the radius r.

The shoulder 33 shown in FIG. 9a surrounds the through-opening continuously, the width w of the shoulder being constant over the circular profile starting from the base, that is, the transition from the surface 35 to the shoulder 33 of the base part 30. It is however also possible for the width "w" of the shoulder 33 to decrease and increased in a serpentine manner transversely to the cross section thickness direction "d" over the circular profile, so that improved plastic deformation of the shoulder 33 is possible. This serpentine reduction in width is also possible in the shoulder 33 shown in FIGS. 9b to 9f.

Figure 9B:
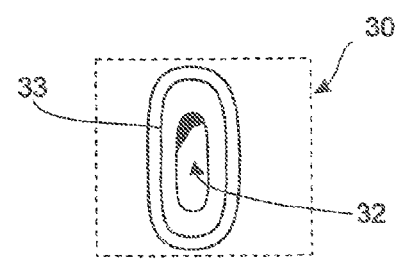

In FIG. 9b, the through-opening 32 is formed as a slot, so that it is possible to align the attachment part 20 in the correct position to the base part 30 according to the embodiment and also for example to compensate irregularities in the arrangement of the through-openings 32 in the base part and the through-openings 22 in the attachment part 22 better.

Figure 9C:
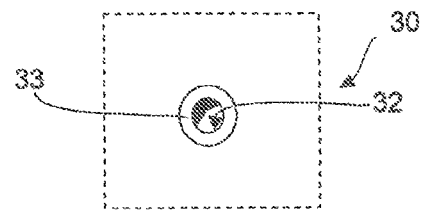

FIG. 9c shows a plan view of the base part 30 according to the embodiment shown in a section view in FIG. 5d. As can be seen here, the shoulder 33 directly borders the through-opening wall 34 of the through-opening 32 with its side facing the through-opening. This has the advantage that the shoulder 33 can also seal off the thread 65 of the screw 61 in a fluid-tight manner when deformed plastically by the attachment part 20 and the screw connection 60.

Figure 9D:
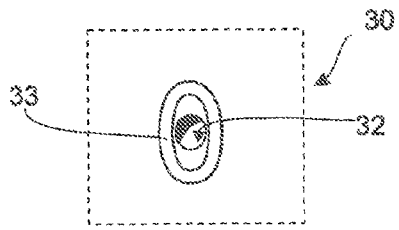
Figure 9E:
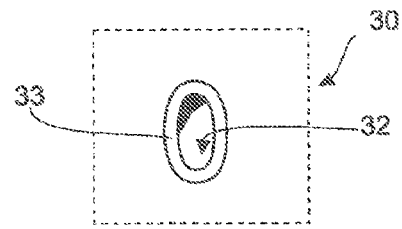
Figure 9F:
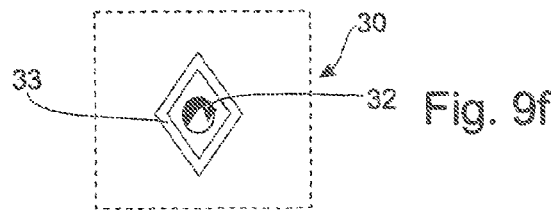

FIGS. 9d and 9e show further plan views of the base part 30 according to the embodiment with a substantially O-shaped profile of the shoulder 33 around the through-opening 32. In FIG. 9d, the shape of the through-opening 32 corresponds to the shape of the through-opening 32 which is shown in FIG. 9a. The embodiment shown in FIG. 9e has a shoulder 33 which also has a substantially O-shaped profile, the through-opening wall 34 of the through-opening 32 directly bordering the side of the shoulder 33 which faces the through-opening 32. Finally, FIG. 9f shows a further embodiment of the base part 30, in which the profile of the shoulder 33 is substantially rhomboid around the substantially circular through-opening 32.

The embodiments of the shoulders 33 of the base parts shown in FIGS. 9a to 9f do not show all the possible variants of the profile of the shoulders 33 around the through-openings 32 and are not an exhaustive representation of all the embodiments of the shoulders 33 of the base part 30 which lie within the scope of protection of the attached patent claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. An intermediate product combination for an internal trim part of a vehicle, comprising:
    a base part having an installation point in which a through-opening is formed for receiving an installation means with which an attachment part can be clamped to the base part on a surface of the base part, wherein the edge region of the through-opening of the base part is provided with a shoulder which surrounds the through-opening and projects from the surface, on which the base part can be installed, at the edge region of the through-opening, so that the attachment part can be supported by the shoulder when the attachment part is installed on the base part, and wherein the shoulder and the base part are integral with each other defining a single monolithic piece.

2. The intermediate product combination according to claim 1, wherein the shoulder surrounds the through-opening in a continuous and circumferential manner.

3. The intermediate product combination according to claim 1, wherein the shoulder is formed in the single monolithic piece with the base part by injection moulding.

4. The intermediate product combination according to claim 2, wherein the shoulder of the base part is arranged at a predefined radial distance (a1, a2) from the through-opening wall.

5. The intermediate product combination according to claim 2, wherein the shoulder comprises a material which allows plastic deformation when pressure is applied to the shoulder.

6. The intermediate product combination according to claim 2, wherein the shoulder has a cross section which is semicircular, triangular or rectangular.

7. An internal trim part for a vehicle, comprising:
    a base part with an installation point in which a through-opening is formed for receiving an installation means with which an attachment part can be clamped to the base part on a surface of the base part, wherein the edge region of the through-opening in the base part is provided with a shoulder which surrounds the through-opening and projects from the surface on which the base part can be installed at the edge region of the through-opening, so that the attachment part can be supported by the shoulder when the attachment part is installed on the base part, wherein the installation means has an installation element which has a first end section for insertion into the through-opening and a second end section for supporting at the installation point of the base part, and a counter element which can be coupled to the first end section so that the attachment part can be clamped to the base part.

8. The internal trim part according to claim 7, wherein the installation element is a screw, a bolt or a rivet and the counter element is a nut or a rivet closing head.

9. The internal trim part according to claim 7, wherein the base part is an injection-moulded part.

* * * * *